United States Patent
Thomas et al.

(10) Patent No.: US 9,273,774 B2
(45) Date of Patent: Mar. 1, 2016

(54) THRUST FORCE REACTIONS IN AN AUTOMATIC TRANSMISSION

(71) Applicant: FORD GLOBAL TECHNOLOGIES, LLC, Dearborn, MI (US)

(72) Inventors: Steven G. Thomas, Bloomfield Hills, MI (US); Gregory D. Goleski, Rochester Hills, MI (US); Jeffrey E. Maurer, Commerce, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 650 days.

(21) Appl. No.: 13/626,967

(22) Filed: Sep. 26, 2012

(65) Prior Publication Data
US 2014/0087910 A1 Mar. 27, 2014

(51) Int. Cl.
*F16H 57/08* (2006.01)
*F16H 3/66* (2006.01)
*F16H 57/021* (2012.01)

(52) U.S. Cl.
CPC *F16H 57/08* (2013.01); *F16H 3/66* (2013.01); *F16H 2057/0216* (2013.01); *F16H 2200/0052* (2013.01); *F16H 2200/2012* (2013.01)

(58) Field of Classification Search
CPC ............ F16H 57/08; F16H 2057/0216; F16H 2057/0816; F16H 2200/2012
See application file for complete search history.

(56) References Cited

U.S. PATENT DOCUMENTS

| | | | |
|---|---|---|---|
| 5,591,099 A * | 1/1997 | Tsukamoto et al. | 475/318 |
| 6,481,553 B1 * | 11/2002 | Lee | 192/70.2 |
| 2002/0065164 A1 * | 5/2002 | Kato et al. | 475/285 |
| 2011/0251015 A1 * | 10/2011 | Nader | 475/331 |

* cited by examiner

*Primary Examiner* — Huan Le
(74) *Attorney, Agent, or Firm* — James Dottavio; MacMillan, Sobanski & Todd, LLC

(57) ABSTRACT

A system producing force reactions in a transmission includes a case including front and rear surfaces, a reaction component, a gearset including a ring gear and a sun gear that transmits a forward force to the front surface, a first path for transmitting a rearward force from the ring gear to the rear surface, a second path for transmitting a forward force from the ring gear to the reaction component, and a third path for transmitting a rearward force from the sun gear to the reaction component.

19 Claims, 4 Drawing Sheets

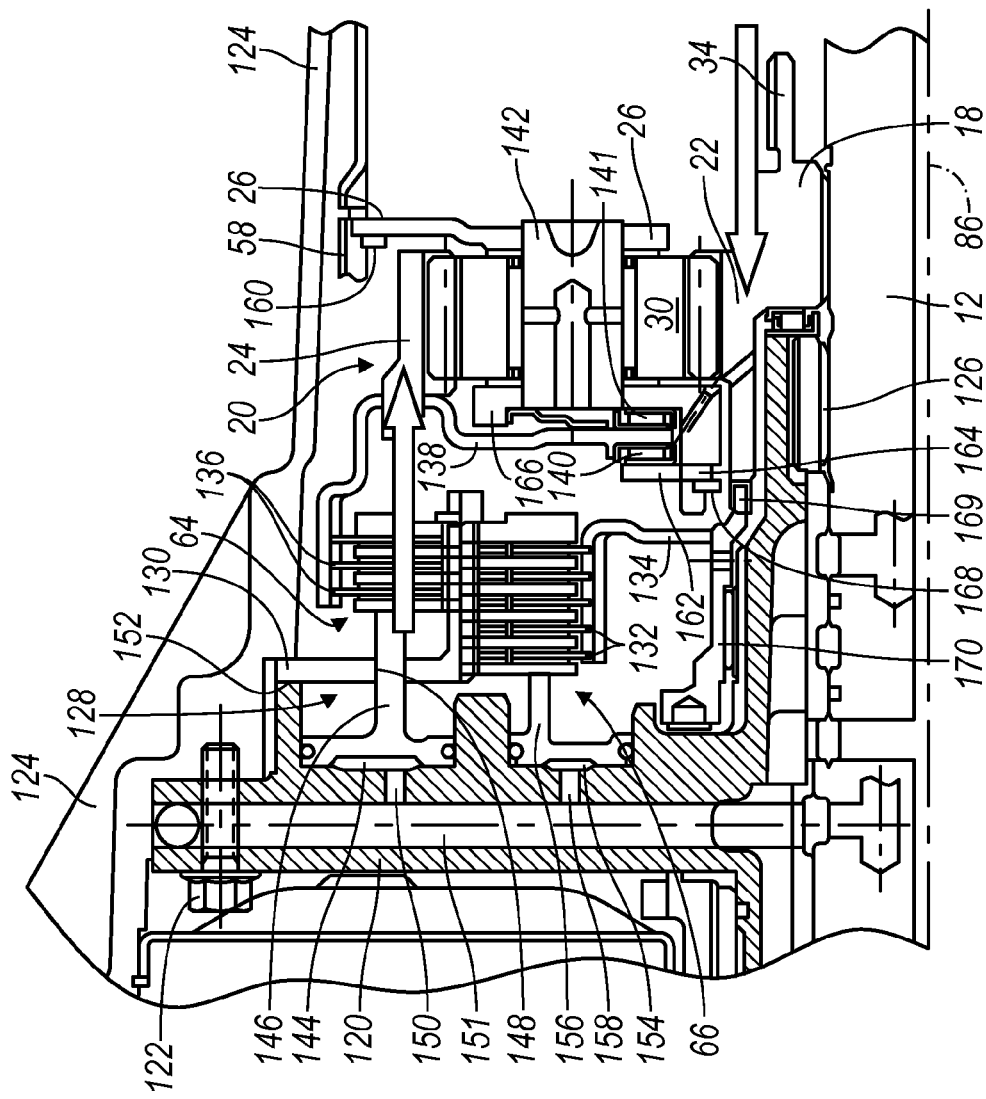
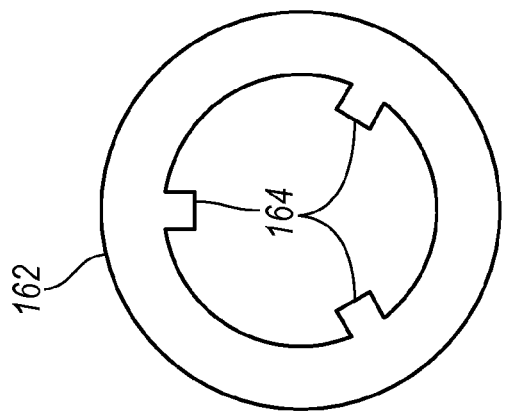
FIG. 4
FIG. 3

THRUST FORCE REACTIONS IN AN AUTOMATIC TRANSMISSION

BACKGROUND OF THE INVENTION

1. Field of the Invention

This invention relates generally to an apparatus for producing thrust force reactions in an automatic transmission, particularly such forces due to transmitting torque between meshing helical gear teeth.

2. Description of the Prior Art

In an automatic transmission a planet pinion carrier supports a set of planet pinions, each member of the set being engaged with a sun gear and a ring gear. Typically, an axial force component, i.e., thrust load, produced due to the helix angle of the meshing gears and pinions and torque transmitted between them, is captured between the sun gear and the ring gear. Thrust load from the sun gear is directed at the ring gear hub, and the thrust load from the ring gear hub is directed at the sun gear. This allows the thrust loads to be cancelled, i.e., reacted by a force of equal magnitude and opposite direction.

Between the ring gear hub and the sun gear hub, a thrust needle bearing is typically used to react the thrust loads and handle the relative speed between the two components. Under coast load conditions, the planetary ring gear and sun gear may thrust apart from each other. Therefore, thrust from the ring and sun must be captured in both directions.

In some transmission applications, the speed differential between the ring gear and the sun gear is very high. That high speed differential across a thrust bearing causes significant frictional loss and adversely affects fuel economy.

SUMMARY OF THE INVENTION

A system producing force reactions in a transmission includes a case including front and rear surfaces, a reaction component, a gearset including a ring gear and a sun gear that transmits a forward force to the front surface, a first path for transmitting a rearward force from the ring gear to the rear surface, a second path for transmitting a forward force from the ring gear to the reaction component, and a third path for transmitting a rearward force from the sun gear to the reaction component.

The system provides an alternate way to transmit ring gear-to-sun gear thrust loads in cases where the speed differential between the ring gear and sun gear is high.

No thrust bearing between the sun gear and the ring gear is required or used.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which:

FIG. 3 is a front view of the thrust washer shown in FIG. 4; and

FIG. 4 is a cross section of a front intermediate portion of the kinematic assembly of FIG. 1;

DESCRIPTION OF THE PREFERRED EMBODIMENT

Figure 1:
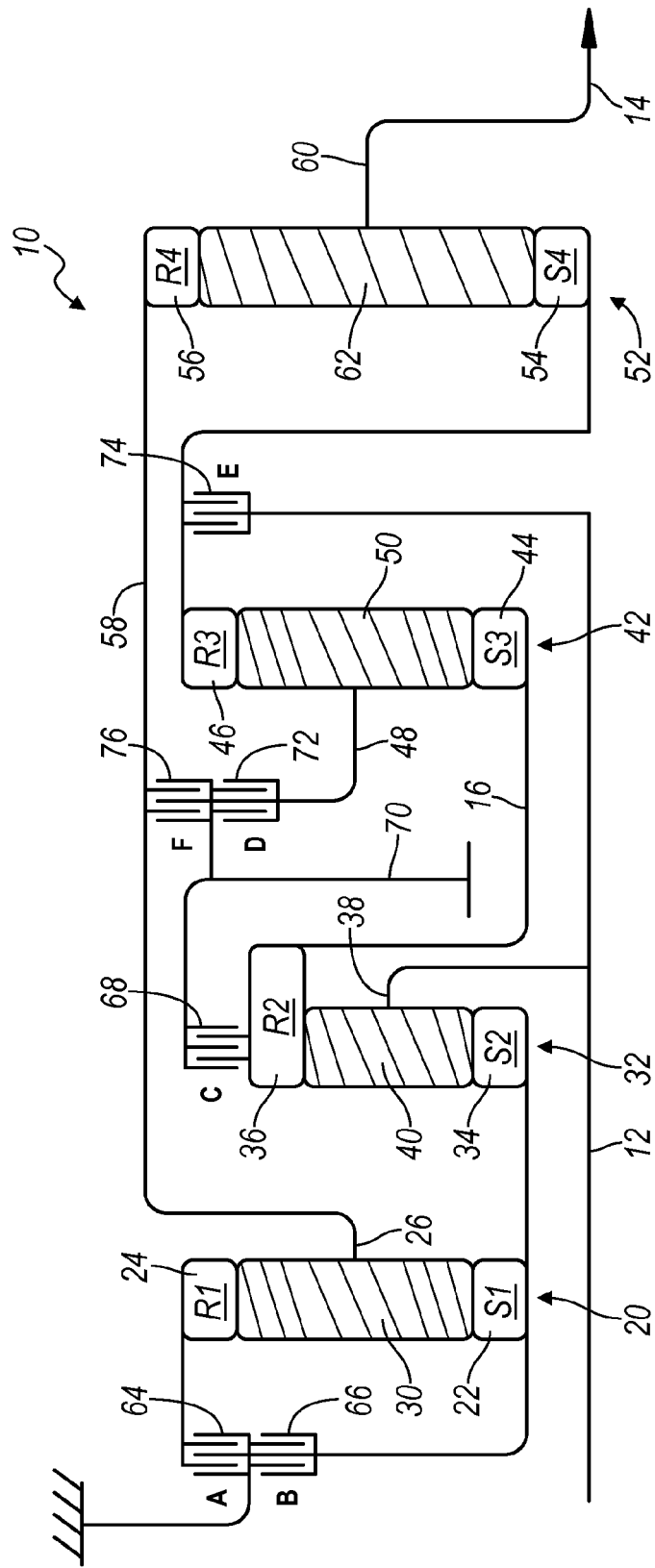
FIG. 1 is a schematic diagram showing a side view of the kinematic assembly for an automatic transmission for a motor vehicle.

The assembly 10 FIG. 1 includes an input 12; output 14; intermediate shaft 16; a first planetary gear set 20 having a first sun gear 22, a first ring gear 24, a first carrier 26; and a set of planet pinions 30 supported on carrier 26 and in continuous meshing engagement with the sun gear 22 and the ring gear 24.

A second planetary gear set 32 includes a second sun gear 34 fixedly coupled to sun gear 22; a second ring gear 36; a second carrier 38 fixedly coupled to the input 12; and a set of planet pinions 40 in supported on carrier 38 and in continuous meshing engagement with sun gear 34 and ring gear 36.

A third planetary gear set 42 includes a third sun gear 44 fixedly coupled to ring gear 36; a third ring gear 46; a third carrier 48; and a set of planet pinions 50 supported on carrier 48 and in continuous meshing engagement with sun gear 44 and ring gear 46.

A fourth planetary gear set 52 includes a fourth sun gear 54 fixedly coupled to ring gear 46; a fourth ring gear 56 fixedly coupled by a shell 58 to carrier 26; a fourth carrier 60 fixedly coupled to output 14; and a set of planet gears 62 supported on carrier 60 and in continuous meshing engagement with sun gear 54 and ring gear 56.

A first brake 64 selectively holds ring gear 24 against rotation.

A second brake 66 selectively holds sun gears 22, 34 against rotation on the transmission case 124.

A first clutch 68 selectively couples ring gear 36 to a clutch housing 70 rotation also on the transmission case 124.

A second clutch 72 selectively couples carrier 48 to clutch housing 70.

A third clutch 74 selectively couples ring gear 46 to input 12.

A fourth clutch 76 selectively couples shell 58 to clutch housing 70.

Figure 2:
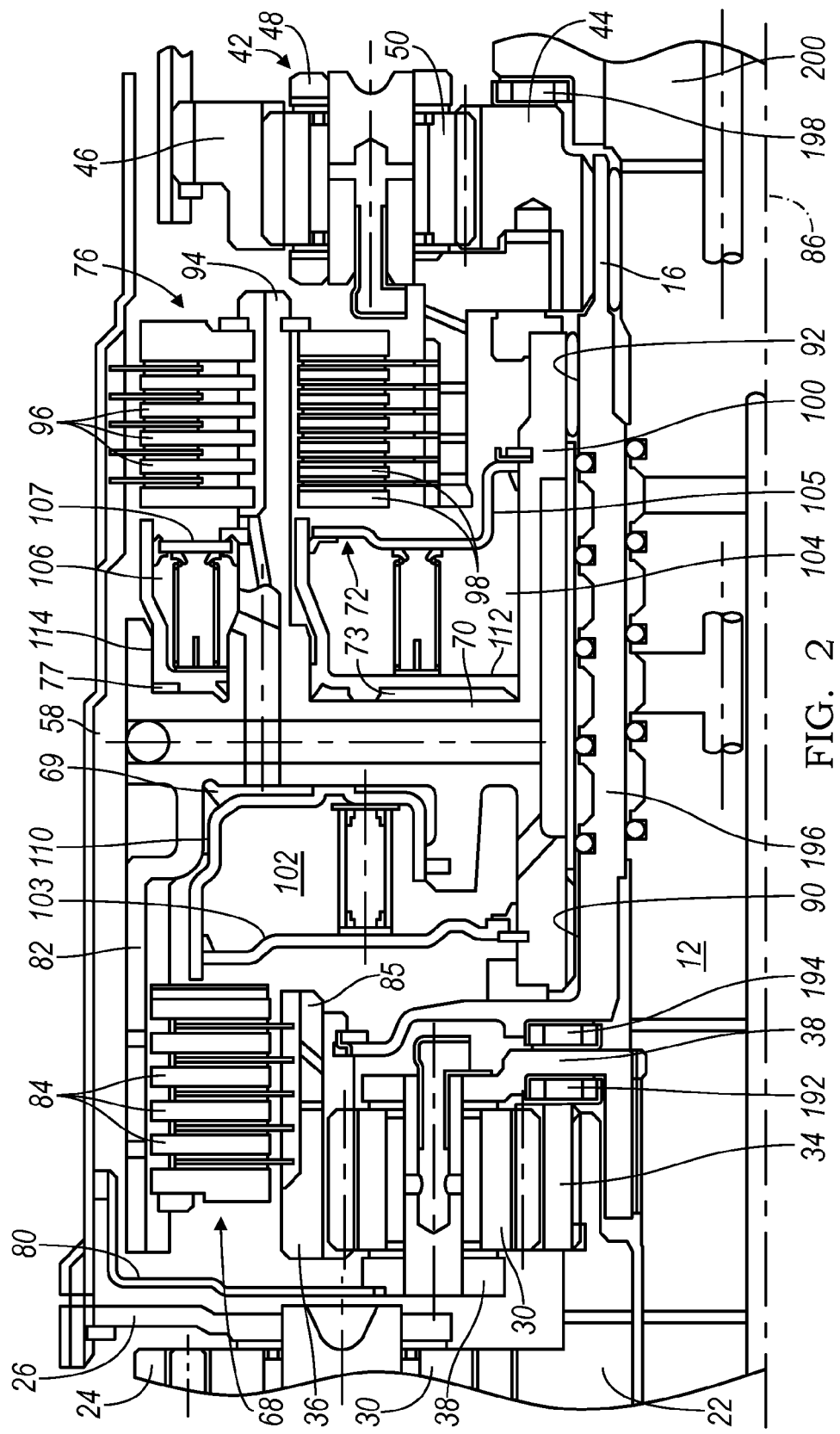
FIG. 2 is a cross section of an intermediate portion of the kinematic assembly of FIG. 1.

FIG. 2 shows that carrier 26 is secured to shell 58.

Clutch housing 70 includes an axial arm 82 formed with internal spine teeth, to which external teeth on the spacer plates 84 of clutch 68 are fixed for rotation with clutch housing 70. The friction plates of clutch 68 are splined to external spline teeth formed on a ring 85, which is formed with ring gear 36.

Intermediate shaft 16, which extends along axis 86 on the radial outer side of input 12, is secured to ring 84 where a snap ring 88 completes the connection. Clutch housing 70 is supported by axially spaced bushings 90, 92 on the radial outer surface of intermediate shaft 16.

Clutch housing 70 includes another axial arm 94 formed with external spine teeth, to which internal teeth on the spacer plates 96 of clutch 76 are fixed for rotation with clutch housing 70. The friction plates of clutch 76 are splined to internal spline teeth formed on a shell 58.

External teeth 98 on the spacer plates of clutch 72 engage internal spline teeth formed on arm 94 of the clutch housing 70. The friction plates of clutch 72 are splined to external spline teeth formed on carrier 48.

Located between bushings 90, 92 and formed in the hub 100 of clutch housing 70 are four feed circuits. A single balance oil feed supplies automatic transmission fluid (ATF) to the pressure balance volumes 102, 104, 106 of clutches 68, 72, 76. Balance dams 103, 105, 107 seal the pressure balance volumes 102, 104, 106 at the pistons 110, 112, 114 of the clutches 68, 72, 76.

Each of the servo cylinders 69, 73, 77 of clutches 68, 72, 76 is supplied with actuating pressure through individual circuits formed in the clutch housing 70. When no actuating pressure is applied to clutches 68, 72, 76, the clutch housing 70 has no fixed connection to any other component of assembly 10.

FIG. 4 shows a pump support 120 secured by bolts 122 to the transmission case 124 and supporting the input shaft 12 on a bushing 126. A hub 128 for brakes 64, 66 includes a radial arm 130, secured to the pump support, and an axial arm formed with external and internal axial splines, to which the spacer plates of the two brakes 64, 66 are secured, respectively.

The friction discs 132 of brake 66 are connected to external, axial spline teeth formed on a disc 134, which is secured to the sun gears 22, 34 through intermediate shaft 18. The friction discs 136 of brake 64 are connected to internal, axial spline teeth formed on a disc 138, which is secured to ring gear 24 and is supported between two thrust bearings 140, 141 located on the carrier 26.

The planet pinions 30 of gearset 20 are supported for rotation on a pinion shaft 142, which is supported on carrier 26.

Pump support 120 is formed with a first cylinder 144 containing a piston 146, which extends though openings 148 into contact with one of the spacer plates of brake 64. Brake-apply pressure is carried through passages 150, 151 to cylinder 144. The openings 148 in hub arm 130 allow an assembler of the brake hub assembly to see though the arm 130 while aligning friction plates 136 with disc 138.

Support 120 is also formed with a second cylinder 154 containing a piston 156, which contacts one of the spacer plates of brake 66. Brake-apply pressure is carried through passage 158 to cylinder 154.

The radial arm 130 of the brake hub 128 is secured to the transmission case 124 such that the arm contacts an axial stop 152, which limits axial displacement of the arm and provides an axial reaction force to the force of piston 146 applied to the plates of brake 64 and the force of piston 156 applied to the plates of brake 66.

Shell 58 is fixed to the carrier 26 of gearset 20 at a snap ring 160.

The thrust washer 162 of FIG. 3 is formed with tabs 164, which engage the forward disc 166 of carrier 26. A retaining ring 168 secures the thrust washer 162 to carrier disc 166.

The lower arrow represents the direction of the thrust force applied to the teeth of sun gear 22 of gearset 20 during positive drive conditions, i.e., when the engine is driving the driven wheels located at the rear of the vehicle.

The upper arrow represents the direction of the thrust force applied to the teeth of ring gear 24 of gearset 20 during positive torque conditions.

The forward directed thrust force of sun gear 22 is transmitted directly through a thrust bearing, located between sun gear 22 and the front surface at the pump support 120, through the pump support 120, to bolts 122 and into the transmission case 124, with which bolts 122 are engaged.

The rearward directed thrust force of ring gear 24 is transmitted by disc 138 to thrust bearing 141, which applies that thrust force to disc 166 of carrier 26. Carrier 26 transmits the force to shell 58.

The rearward thrust force of ring gear 24 is transmitted axially rearward by shell 58 to ground at a rear surface of the transmission case 124 near the rear of the transmission. No thrust bearing between sun gear 22 and ring gear 24 is required or used.

Figure 5:
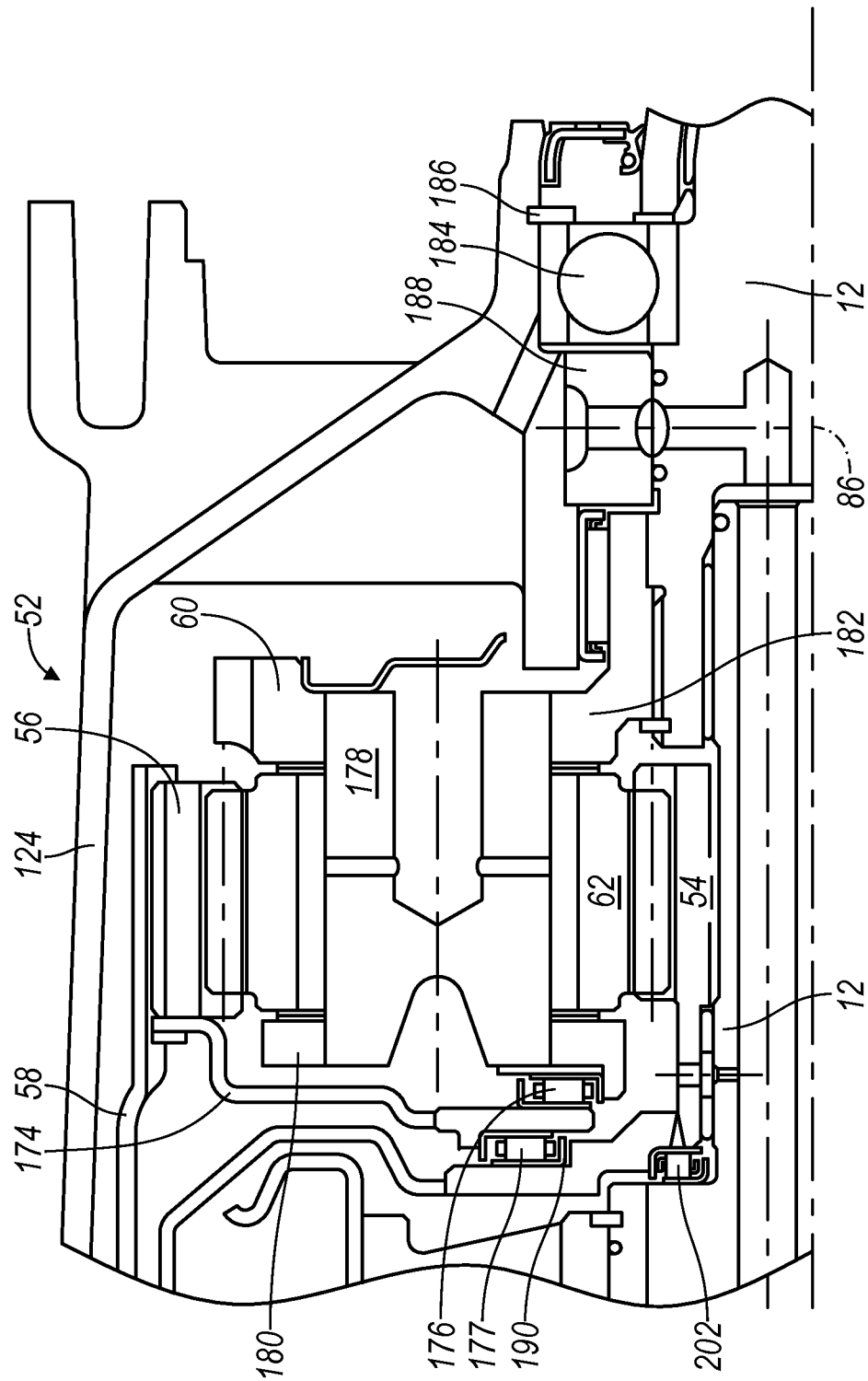
FIG. 5 is a cross section of a rear portion of the kinematic assembly of FIG. 1.

As shown in FIG. 5, shell 58 is secured to a disc 174, which extends radially toward axis 86 between thrust bearings 176, 177. The discs 180, 182 of carrier 60 are secured mutually. A bearing 184 is secured to the transmission case 124 by a retaining ring 186. A ring 188 fitted over the outer diameter of output shaft 14, contacts the carrier 60 and the inner and outer races of bearing 184 where the rearward thrust force of ring gear 24 is reacted at the rear surface of the transmission case 124.

Under positive torque conditions, the thrust force of ring gear 24 is transmitted axially rearward by shell 58 to ground on the transmission case 124 near the rear of the transmission. The rearward thrust force of ring gear 24 is transmitted through a path that includes disc 174, thrust bearing 176, disc 180 of carrier 60, disc 182 of carrier 60, ring 188, and bearing 184 to an axial thrust force reaction on transmission case 124.

Under negative torque conditions, i.e., when the wheels are transmitting torque to the engine, the direction of the ring gear thrust force and sun gear thrust force is reversed relative to the direction of the arrows shown in FIG. 2.

Under negative torque conditions, the forward thrust force of ring gear 24 is transmitted through a path that includes disc 138, thrust bearing 140, thrust washer 162, retaining ring 168, carrier 26, shell 58, ring gear 56, disc 174 and thrust bearing 177 to disc 190.

Under negative torque conditions, the rearward thrust force of sun gear 22 is transmitted through a path that includes sun gear 34, thrust bearing 192, carrier 38, input shaft 12, thrust bearing 202 to disc 190.

Disc 190 is an intermediate reaction component, to which the rearward thrust force of sun gear 22 and the forward thrust force of ring gear 24 are applied under negative torque conditions and within which these oppositely directed forces are mutually reacted.

In accordance with the provisions of the patent statutes, the preferred embodiment has been described. However, it should be noted that the alternate embodiments can be practiced otherwise than as specifically illustrated and described.

The invention claimed is:

1. A system producing force reactions in a transmission, comprising:
    a case including front and rear surfaces;
    a reaction component;
    a gearset including a ring gear and a sun gear, which transmits a forward force to the front surface;
    a second gearset located axially between the reaction component and the gearset;
    a first path for transmitting a rearward force from the ring gear to the rear surface;
    a second path for transmitting a second forward force from the ring gear to the reaction component;
    a third path for transmitting a second rearward force from the sun gear to the reaction component.

2. The system of claim 1, further comprising a support secured to the case, the support including the front surface.

3. The system of claim 1, wherein the front surface is located forward of the sun gear.

4. The system of claim 1, further comprising a bearing secured to the case adjacent to a location where a transmission output shaft extends out of the case, the bearing contacting the rear surface.

5. The system of claim 1, wherein the rear surface is located rearward of the gearset.

6. The system of claim 1, wherein:
the gearset further comprises a carrier and pinions supported on the carrier and meshing with the sun gear and ring gear; and
the first and second paths include a shell secured to the carrier and extending rearward toward the rear surface and the reaction component, the shell contacting a third gearset rearward of the reaction component.

7. The system of claim 1, wherein:
the gearset further comprises a carrier and pinions supported on the carrier and meshing with the sun gear and ring gear; and
the second path includes a washer supported directly on the carrier, and a thrust bearing that transmits the forward force from the ring gear to the washer.

8. The system of claim 1, wherein:
the gearset further comprises a carrier and pinions supported on the carrier and meshing with the sun gear and ring gear;
the second path includes a shell secured to the carrier and extending rearward toward the rear surface and the reaction component and a first thrust bearing for transmitting the forward force from the ring gear to the reaction component; and
the third path includes a third thrust bearing, located rearward of the second gearset, for transmitting the rearward force from the sun gear to the reaction component.

9. The system of claim 1, wherein the reaction component is spaced from the ring gear and the sun gear.

10. A system producing force reactions in a transmission, comprising:
a case including front and rear surfaces;
a gearset including a ring gear and a sun gear;
a component that transmits a forward force from the sun gear to the front surface, the component spaced from the ring gear and the sun gear;
a path for transmitting a rearward force from the ring gear to the rear surface; and
wherein the gearset further comprises a carrier and pinions supported on the carrier and meshing with the sun gear and ring gear, and the path includes a shell secured to the carrier and extending rearward toward the rear surface, the shell directly engaging a second gearset.

11. The system of claim 10, further comprising a support secured to the case, the support including the front surface.

12. The system of claim 10, further comprising a bearing secured to the case adjacent to a location where a transmission output shaft extends out of the case, the bearing contacting the rear surface.

13. A system producing force reactions in a transmission, comprising:
a gearset including a ring gear and a sun gear;
a reaction component spaced from the ring and sun gears;
a first path for transmitting a forward force from the ring gear to the reaction component; and
a second path for transmitting a rearward force from the sun gear to the reaction component.

14. The system of claim 13, wherein:
the gearset further comprises a carrier and pinions supported on the carrier and meshing with the sun gear and ring gear; and
the first path includes a shell secured to the carrier and extending rearward toward the reaction component, the shell contacting a second gearset.

15. The system of claim 13, wherein:
the gearset further comprises a carrier and pinions supported on the carrier and meshing with the sun gear and ring gear; and
the first path includes a washer supported directly on the carrier, and a thrust bearing that transmits the forward force from the ring gear to the washer.

16. The system of claim 13, wherein:
the gearset further comprises a carrier and pinions supported on the carrier and meshing with the sun gear and ring gear;
the first path includes a shell secured to the carrier and extending rearward toward the reaction component, and a first thrust washer for transmitting the forward force from the ring gear to the reaction component; and
the second path includes a third thrust bearing for transmitting the rearward force from the sun gear to the reaction component.

17. The system of claim 13, further comprising:
a case including a front surface; and
a support secured to the case, the support including the front surface, to which a reaction to a forward force on the sun gear is applied.

18. The system of claim 13, further comprising:
a case including a rear surface; and
a bearing secured to the case adjacent to a location where a transmission output shaft extends out of the case, the bearing contacting the rear surface.

19. The system of claim 13, wherein:
the gearset further comprises a carrier and pinions supported on the carrier and meshing with the sun gear and ring gear; and
further comprising a third path that includes a washer supported directly on the carrier, and a third thrust bearing that transmits a forward force from the ring gear to the washer.

* * * * *